(12) United States Patent
Carter et al.

(10) Patent No.: US 7,686,202 B1
(45) Date of Patent: Mar. 30, 2010

(54) GIMBALED-SHOULDER FRICTION STIR WELDING TOOL

(75) Inventors: Robert W. Carter, Huntsville, AL (US); Kirby G. Lawless, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 262 days.

(21) Appl. No.: 11/543,287

(22) Filed: Sep. 29, 2006

(51) Int. Cl.
*B23K 20/12* (2006.01)
*B23K 37/00* (2006.01)
(52) U.S. Cl. .......................... 228/2.1; 228/2.3
(58) Field of Classification Search ............ 228/2.1, 228/2.3
See application file for complete search history.

(56) References Cited

U.S. PATENT DOCUMENTS

| | | | |
|---|---|---|---|
| 2,625,018 A * | 1/1953 | Dunn | 464/66.1 |
| 5,697,544 A | 12/1997 | Wykes | |
| 5,718,366 A * | 2/1998 | Colligan | 228/112.1 |
| 5,893,507 A | 4/1999 | Ding et al. | |
| 6,050,475 A | 4/2000 | Kinton et al. | |
| 6,199,745 B1 * | 3/2001 | Campbell et al. | 228/112.1 |
| 6,227,430 B1 | 5/2001 | Rosen et al. | |
| 6,237,835 B1 | 5/2001 | Litwinski et al. | |
| 6,484,924 B1 | 11/2002 | Forrest | |
| 6,543,671 B2 | 4/2003 | Hatten et al. | |
| 6,557,746 B2 | 5/2003 | Ezumi et al. | |
| 6,595,403 B2 | 7/2003 | Okamura et al. | |
| 6,669,075 B2 | 12/2003 | Colligan | |
| 6,715,665 B2 | 4/2004 | Hirano et al. | |
| 6,758,382 B1 | 7/2004 | Carter | |
| RE39,019 E | 3/2006 | Tully et al. | |
| 2003/0028281 A1 | 2/2003 | Adams et al. | |
| 2003/0201307 A1 | 10/2003 | Waldron et al. | |
| 2004/0079787 A1 | 4/2004 | Okamoto et al. | |
| 2005/0029330 A1 | 2/2005 | Kohn | |

FOREIGN PATENT DOCUMENTS

JP  2003181654 A  *  7/2003
WO  WO 2006081819 A1  *  8/2006

* cited by examiner

*Primary Examiner*—Jessica L. Ward
*Assistant Examiner*—Jacky Yuen
(74) *Attorney, Agent, or Firm*—James J. McGroary; Peter J. Van Bergen

(57) ABSTRACT

A gimbaled-shoulder friction stir welding tool includes a pin and first and second annular shoulders coupled to the pin. At least one of the annular shoulders is coupled to the pin for gimbaled motion with respect thereto as the tool is rotated by a friction stir welding apparatus.

8 Claims, 2 Drawing Sheets

GIMBALED-SHOULDER FRICTION STIR WELDING TOOL

ORIGIN OF THE INVENTION

The invention was made by employees of the United States Government and may be manufactured and used by or for the Government for governmental purposes without the payment of any royalties.

BACKGROUND OF THE INVENTION

1. Field of the Invention

This invention relates to friction stir welding tools. More specifically, the invention is a friction stir welding tool having at least one gimbaled shoulder contacting a workpiece.

2. Description of the Related Art

Many friction stir welding (FSW) apparatus utilize a welding tool that has two spaced-apart shoulders fixedly mounted to a welding pin that is rotated about its axis by the FSW apparatus. The two shoulders rotate with the pin and ride on the respective front and back (or top and bottom) of the workpiece being welded. If the thickness of the workpiece varies as the welding tool is moved therealong, the leading edge of one or both shoulders tend to dig into the workpiece which causes excessive weld flashing to develop along the weld.

SUMMARY OF THE INVENTION

Accordingly, it is an object of the present invention to provide a friction stir welding (FSW) tool that can adapt to varying-thickness workpieces.

Another object of the present invention is to provide a FSW tool that adjusts itself to handle welds of constant thickness, tapering thickness and complex curvature joints.

Other objects and advantages of the present invention will become more obvious hereinafter in the specification and drawings.

In accordance with the present invention, a tool is provided for use in friction stir welding. The tool includes a pin and first and second annular shoulders coupled to the pin. The shoulders are spaced apart from one another along the pin's longitudinal axis. The pin is further adapted to be coupled to a friction stir welding apparatus for rotation about its longitudinal axis. At least one of the first and second annular shoulders is coupled to the pin for gimbaled motion with respect thereto.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
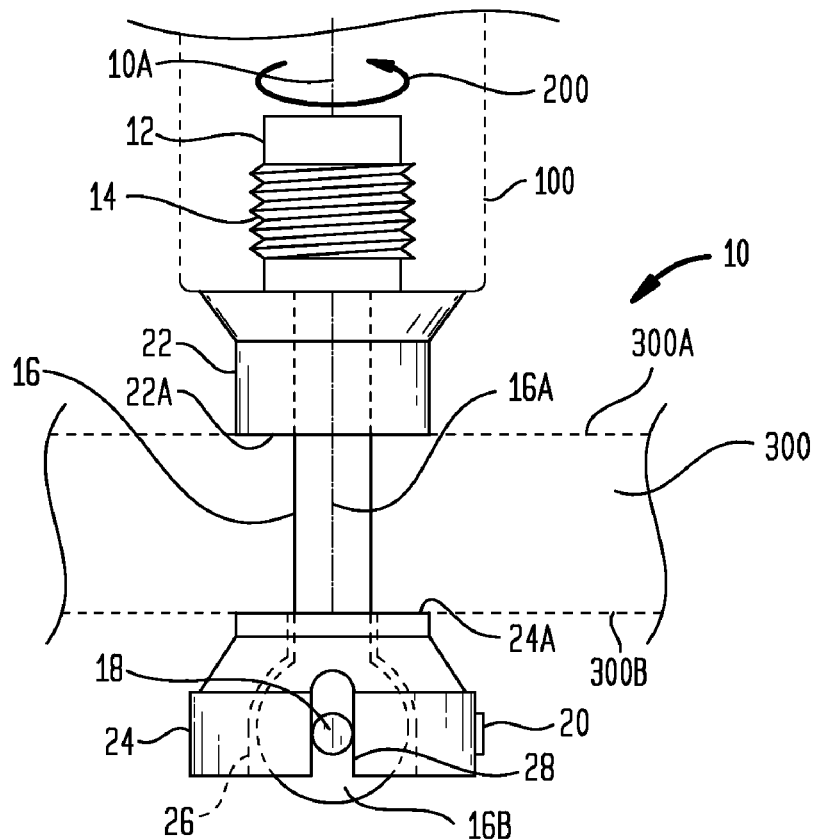
FIG. 1 is a side view of a gimbaled-shoulder friction stir welding tool in accordance with an embodiment of the present invention.
Figure 2:
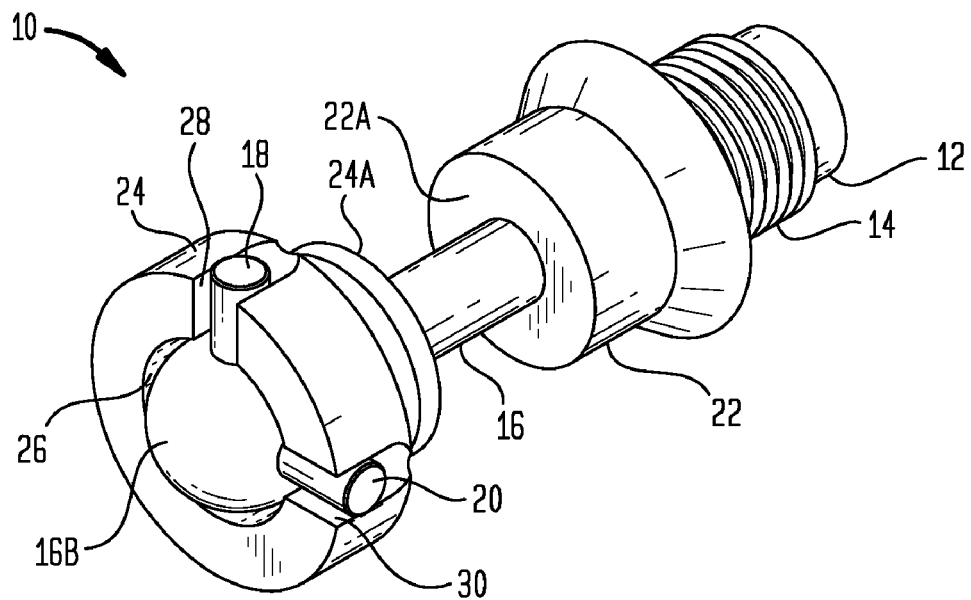
FIG. 2 is a perspective view of the embodiment shown in FIG. 1 illustrating the underside of the gimbaled-shoulder tool.

Referring now to the drawings, simultaneous reference will be made to FIGS. 1 and 2 where a gimbaled-shoulder friction stir welding (FSW) tool in accordance with an embodiment of the present invention is shown and is referenced generally by numeral 10. Tool 10 will be coupled to a FSW apparatus, a portion of which is illustrated in phantom lines and is referenced by numeral 100. In general, FSW apparatus 100 will cause tool 10 to rotate about its longitudinal axis 10A as indicated by arrow 200. A variety of such FSW apparatus are well known in the art. Accordingly, it is to be understood that the particular type of FSW apparatus is not a limitation of the present invention.

Typically, tool 10 has a base or support 12 that facilitates the coupling of tool 10 to FSW apparatus 100. By way of non-limiting example, support 12 can have threads 14 formed thereon that thread into FSW apparatus 100. Of course, support 12 can be coupled to FSW apparatus 100 in other ways without departing from the scope of the present invention.

Coupled to and extending from support 12 is a pin 16 such that pin 16 will rotate about its axis 16A with support 12 when FSW apparatus 100 is operated. Axis 16A is coincident with the longitudinal axis 10A of tool 10. In the illustrated embodiment, pin 16 terminates at its distal end 16B with a bulbous or ball shape from which two indexing pins 18 and 20 extend radially outward therefrom. More specifically, indexing pins 18 and 20 are oriented 90° away from each other in a plane perpendicular to axis 16A. The function of indexing pins 18 and 20 will be explained further below.

Tool 10 further includes two annular shoulders 22 and 24 separated from one another along pin 16. Upper shoulder 22 is fixedly coupled to support 12 and/or pin 16 for rotation therewith about axis 16A. Upper shoulder 22 is disposed annularly about pin 16. The lower surface 22A of upper shoulder 22 will ride on the top surface 300A of a workpiece 300 (shown in phantom lines) to be welded as pin 16 rotates.

Opposing upper shoulder 22 is lower shoulder 24 also disposed annularly about pin 16 with its upper surface 24A riding along the bottom surface 300B of workpiece 300. Rather than being fixedly coupled to pin 16, lower shoulder 24 is loosely coupled to pin 16 such that lower shoulder 24 can rotate with pin 16 while simultaneously experiencing gimbaled motion relative to pin 16. To achieve this function in the illustrated embodiment, lower shoulder 24 defines a socket 26 (FIG. 2) that engages the ball-shaped distal end 16B of pin 16 as indexing pins 18 and 20 engage correspondingly-positioned slotted notches 28 and 30 in lower shoulder 24. The engagement of indexing pins 18 and 20 in respective slotted notches 28 and 30 links lower shoulder 24 to pin 16 such that it will rotate with pin 16. At the same time, the loose engagement of indexing pins 18 and 20 in slotted notches 28 and 30 allows lower shoulder 24 to gimbal on distal end 16B of pin 16 when forces are applied to upper surface 24A.

In operation, as FSW apparatus 100 rotates support 12/pin 16, upper shoulder 22 and lower shoulder 24 rotate therewith as indexing pins 18 and 20 engage notches 28 and 30, respectively. If the thickness of workpiece 300 changes as FSW apparatus 100 moves tool 10 therealong, the changing thickness of workpiece 300 applies forces to upper surface 24A of lower shoulder 24 with the applied forces causing lower shoulder 24 to gimbal. For example, if workpiece 300 gets thicker as tool 10 moves therealong, a downward force (i.e., where "downward" is relative to the illustrated orientation of tool 10) will be applied to the leading edge of upper surface 24A causing it to pitch downward so that the leading edge does not dig into workpiece 300. Conversely, if workpiece 300 gets thinner as tool 10 moves therealong, a downward force (i.e., where "downward" is relative to the illustrated orientation of tool 10) will be applied to the trailing edge of upper surface 24A causing it to pitch upward so that the trailing edge does not dig into workpiece 300. In this way, excessive weld flashing is eliminated.

The present invention is not limited to the specifics of the illustrated embodiment. For example, the gimbaled motion between lower shoulder 24 and pin 16 can be provided by a number of other constructions without departing from the scope of the present invention. Also, the tool of the present invention could be constructed so that the upper shoulder thereof was capable of gimbaled motion as opposed to the lower shoulder as in the illustrated embodiment. Still further, depending on the construction of the FSW apparatus to which the tool is to be mounted, it is possible that the tool of the present invention does not require a support (i.e., support 12). That is, the tool of the present invention might only include the pin and two annular shoulders.

The advantages of the present invention are numerous. The gimbaled-shoulder friction stir welding tool automatically adapts to workpiece variations without requiring any complex control systems. Thus, the tool provides a simple and inexpensive way to improve the quality of friction stir welds.

Figure 3:
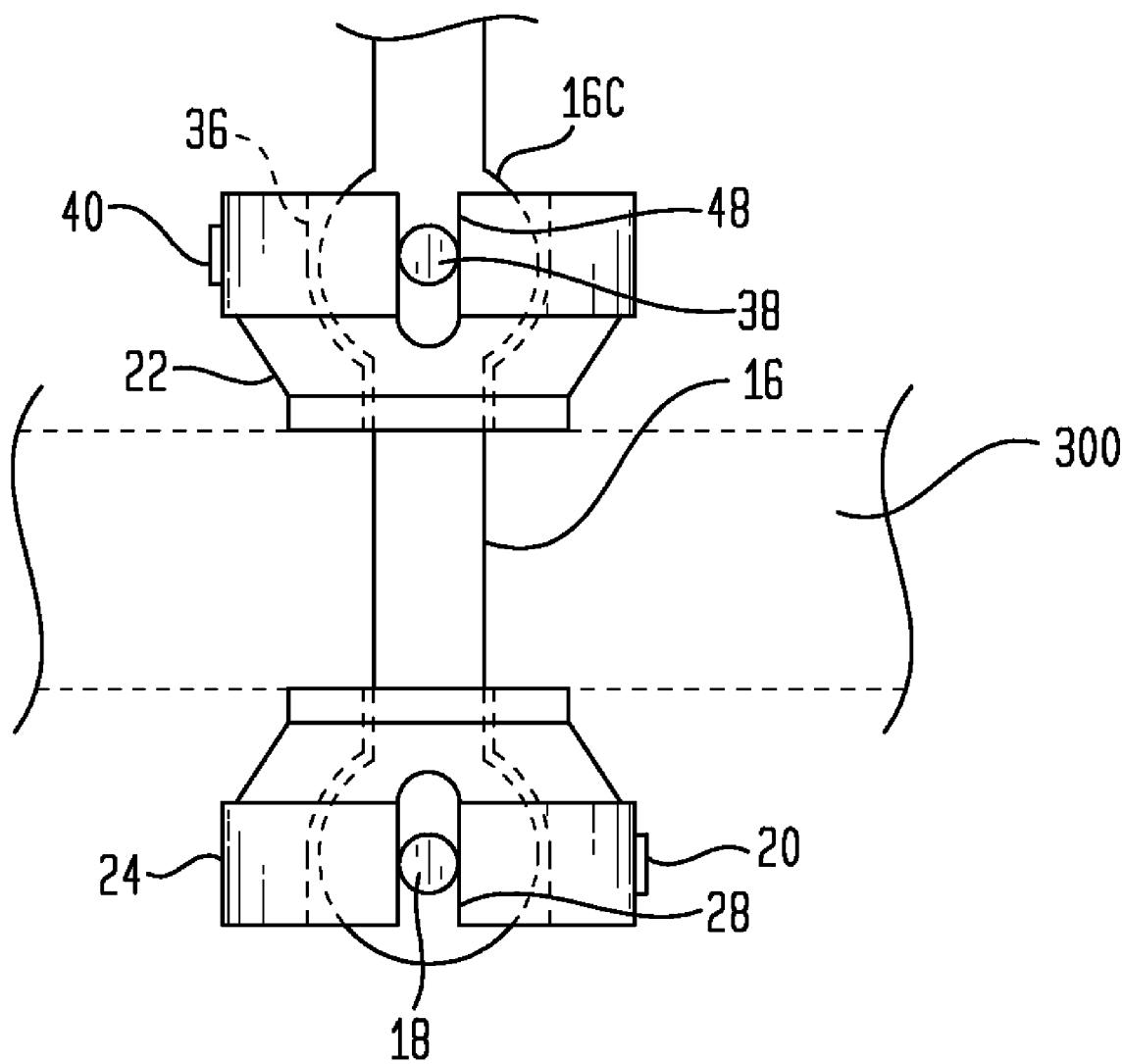
FIG. 3 is a side view of a two gimbaled-shoulder tool in accordance with another embodiment of the present invention.

Although the invention has been described relative to a specific embodiment thereof, there are numerous variations and modifications that will be readily apparent to those skilled in the art in light of the above teachings. For example, as illustrated in FIG. 3, the tool of the present invention could be constructed with two gimbaled shoulders. That is, upper shoulder 22 could also be loosely coupled to pin 16 to rotate therewith while simultaneously being capable of experiencing gimbaled motion with respect thereto. By way of an illustrative example, this can be achieved in the same way as previously described for lower shoulder 24. Accordingly, pin 16 can include an intermediately-positioned bulbous or ball-shaped region 16C that is engaged by a socket 36 defined in upper shoulder 22. Indexing pins 38 and 40 extending radially from region 16C are engaged in slotted notches formed in upper shoulder 22 in a similar fashion to that previously described for lower shoulder 24. Note that only one such slotted notch (i.e., slotted notch 48) is visible in FIG. 3. It is therefore to be understood that, within the scope of the appended claims, the invention may be practiced other than as specifically described.

What is claimed as new and desired to be secured by Letters Patent of the United States is:

1. A tool for use in friction stir welding, comprising:
   a support body adapted to be coupled to a friction stir welding apparatus for rotation thereby;
   a pin fixedly coupled to and extending from said support body for rotation therewith;
   first and second annular shoulders coupled to said pin and spaced apart from one another, said first and second annular shoulders adapted to be disposed on opposing sides of a workpiece;
   at least one of said first and second annular shoulders defining a socket;
   said pin including a bulbous portion thereof for engagement in said socket; and
   a plurality of indexing pins fixed to and extending radially outward from said bulbous portion for loose engagement with slotted notches formed in said at least one of said first and second annular shoulders, wherein said at least one of said first and second annular shoulders is coupled to said pin for simultaneous rotation therewith and gimbaled motion with respect thereto such that changes in thickness of the workpiece changes forces applied to said at least one of said first and second annular shoulders to directly control relative orientations between said first and second annular shoulders as said pin rotates.

2. A tool as in claim 1 wherein each of said first and second annular shoulders is coupled to said pin for rotation therewith.

3. A tool for use in friction stir welding, comprising:
   a pin having a longitudinal axis, said pin being adapted to be coupled to a friction stir welding apparatus for rotation about said longitudinal axis;
   first and second annular shoulders coupled to said pin and spaced apart from one another, said first and second annular shoulders adapted to be disposed on opposing sides of a workpiece;
   at least one of said first and second annular shoulders defining a socket;
   said pin including a portion thereof for engagement in said socket; and
   a plurality of indexing pins fixed to and extending radially outward from said portion of said pin engaged in said socket and perpendicular to said longitudinal axis for loose engagement with slotted notches formed in said at least one of said first and second annular shoulders, wherein said at least one of said first and second annular shoulders is coupled to said pin for simultaneous rotation therewith and gimbaled motion with respect thereto such that changes in thickness of the workplace changes forces applied to said at least one of said first and second annular shoulders to directly control relative orientations between said first and second annular shoulders as said pin rotates.

4. A tool as in claim 3 wherein each of said first and second annular shoulders is coupled to said pin for rotation therewith.

5. A tool for use in friction stir welding, comprising:
   a pin having a longitudinal axis, said pin being adapted to be coupled to a friction stir welding apparatus for rotation about said longitudinal axis, said pin having a distal end that is at least partially spherical;
   a first annular shoulder fixedly coupled to said pin for rotation therewith, said first annular shoulder opposing and separated from said distal end of said pin;
   a second annular shoulder forming a socket disposed about said pin, said first and second annular shoulders adapted to be disposed on opposing sides of a workpiece; and
   a plurality of indexing pins fixed to and extending radially outward from said distal end and perpendicular to said longitudinal axis for loose engagement with slotted notches formed in said second annular shoulder, wherein said second annular shoulder is loosely coupled to said distal end of said pin to simultaneously provide (i) rotation with said pin, and (ii) gimbaled motion relative to said distal end such that changes in thickness of the workpiece changes forces applied to said second annular shoulder to directly control orientation of said second annular shoulder as said pin rotates.

6. A tool as in claim 1 wherein said plurality of indexing pins comprises two indexing pins oriented with an angle of 90° therebetween.

7. A tool as in claim 3 wherein said plurality of indexing pins comprises two indexing pins oriented with an angle of 90° therebetween.

8. A tool as in claim 5 wherein said plurality of indexing pins comprises two indexing pins oriented with an angle of 90° therebetween.

* * * * *